Patented Oct. 5, 1943

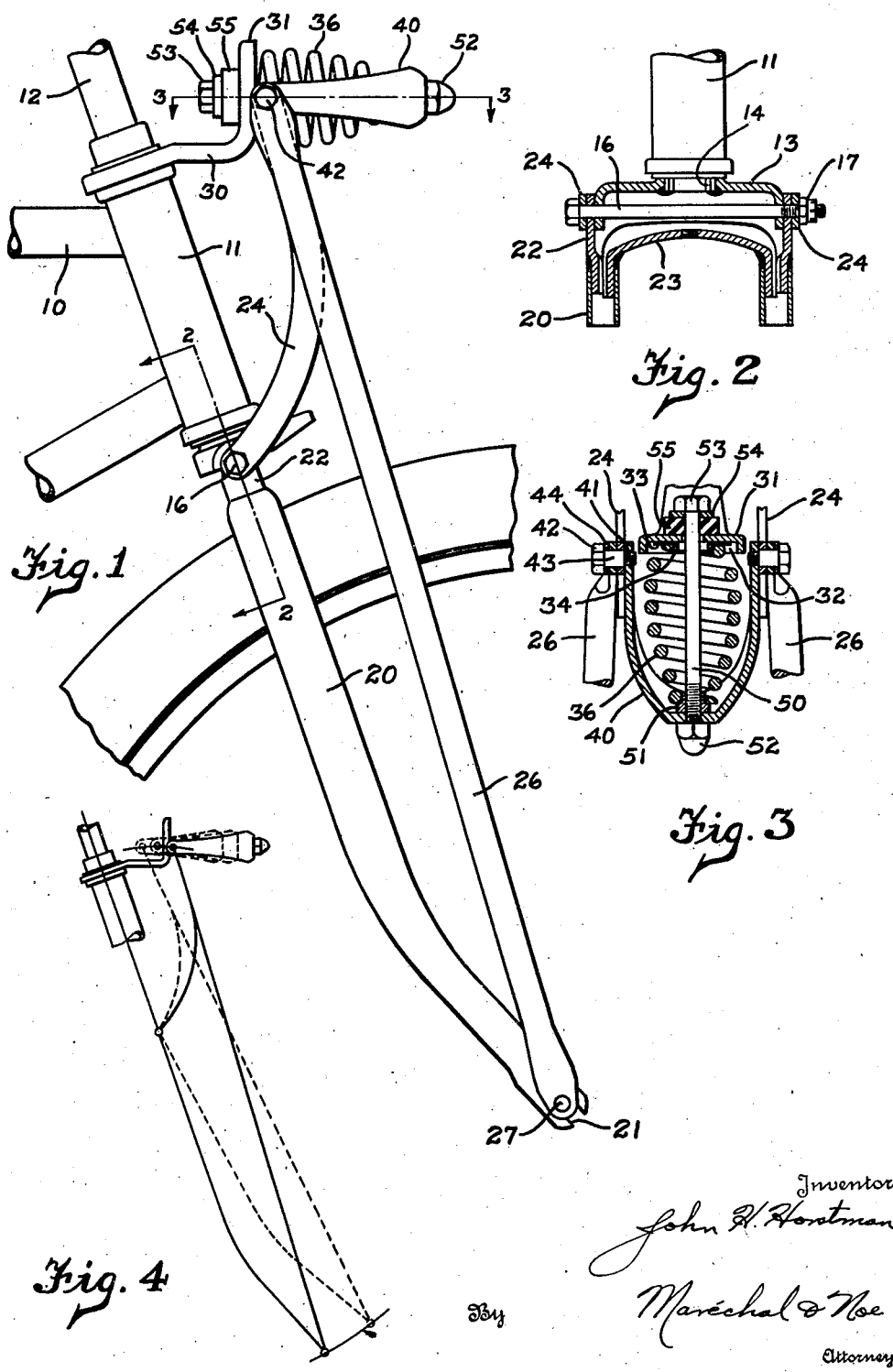

2,330,892

UNITED STATES PATENT OFFICE 2,330,892

BICYCLE

John H. Horstman, Dayton, Ohio, assignor to The Huffman Manufacturing Company, Dayton, Ohio, a corporation of Ohio Application April 8, 1941, Serial No. 387,456

1 Claim. (Cl. 280—276)

This invention relates to bicycles and more particularly to a resiliently mounted bicycle.

It is the principal object of the invention to provide a resilient mounting for the front wheel of a bicycle that is simple in construction, readily accessible for adjustment and which is capable of long life and with substantial freedom from objectionable wear.

It is a further object to provide such a front wheel mounting in which the forces of compression are controlled to act at all times in direct opposition to the supporting structure, and in which the position of the mechanism is automatically varied with each condition of loading and compression in use to maintain a predetermined line of action of the compression force.

It is a still further object to provide such a mounting in which the parts transmitting the force move in substantially a plane throughout the range of movement of the operating parts.

Other objects and advantages will be apparent from the following description, the accompanying drawing, and the appended claim.

In the drawing, which discloses a preferred embodiment of the invention,

Fig. 1 is a broken view showing the elements of a bicycle frame together with the resilient front fork structure of the present invention;

Fig. 2 is a broken sectional view on the line 2—2 of Fig. 1;

Fig. 3 is a horizontal broken sectional view on the line 3—3 of Fig. 1; and

Fig. 4 is a diagrammatic view showing the principal elements of the structure in various positions of adjusting movement.

The bicycle frame is indicated generally at 10 and comprises any suitable frame structure to which is attached the head member 11, usually being integrally secured as by welding or the like. The steering post 12 projects upwardly from the head for receiving the handle bars, and from the lower portion of the head there projects in the usual manner the fork crown 13, this being reinforced internally by the steel reinforcement member 14, also in accordance with usual practice. The post 12 and fork crown 13 are thus rotatable together with respect to head 11 and form a steering post assembly.

The fork crown in accordance with the present invention is apertured to receive transverse hinge bolt 16 carrying a castle nut 17 at its one end, the bolt being suitably drilled to receive a cotter pin or the like for securing the nut against accidental loosening.

The fork sides are shown at 20, having their lower ends either apertured or slotted as shown at 21, and at their upper ends being provided with brackets 22, secured in place by welding or the like, and apertured to be received over hinge bolt 16, at opposite sides of the fork crown. The two fork sides are also permanently secured together by means of fork yoke 23 also welded respectively to the upper ends of the fork sides.

A pair of reinforcement members 24, in the form of control braces, are likewise received over the hinge bolt, and preferably located outwardly of the brackets 22. Such reinforcement members are provided with suitable forward and upward curvatures to present a pleasing and attractive outline, and to provide the proper reinforcement for the main control rods, now to be described.

The two control rods 26 extend from the wheel axle, and are suitably apertured at 27 to be received over the wheel shaft upon opposite sides thereof. They are preferably of tubular construction to provide the maximum strength characteristics without excessive weight, and project upwardly and terminate adjacent the upper ends of control braces 24.

Above the upper end of head 11 there is a bracket 30, which is formed with an upwardly extending abutment plate 31, this bracket being bolted in place upon the steering post assembly, and hence maintaining a rigid relationship with respect to the steering post assembly. As shown in Fig. 1, the abutment plate 31 stands substantially vertically, and also is preferably located approximately in the vertical plane passing through the axis of hinge pin 16 and the pivotal mounting of the fork sides 20.

The abutment plate 31 is provided with a central aperture, and on the forward side is recessed as shown at 32. Within this recess and surrounding the aperture there is fastened a guide washer 33, preferably secured to the face of the plate as by welding or the like. The washer has an annular forwardly projecting collar 34 of substantially larger interior diameter than the aperture through the plate, and adapted to serve as a guide and supporting surface for the end of a compression spring 36. As shown the spring is of suitable diameter and shape to fit over the washer 33 and the annular collar 34, the end coil of the spring being flattened so that it has a proper seat against the washer and the face of the abutment plate, such that when compressed or under load, it normally tends to maintain itself in a predetermined relation to the face of such plate. Preferably this relationship is such that the spring tends to stand perpendicular to the face of the plate.

A yoke member 40 having a substantially U shape is provided for engaging with the opposite end of the spring and for interconnecting with the ends of the control rods to transmit the spring force thereto. For this purpose the outer ends of the yoke are provided with threaded apertures as shown at 41, to receive the end of shouldered bolt members 42. The shoulder 43 is of larger diameter than the threaded portion, and when fastened into the yoke is adapted to be received against the outer face of the yoke thus providing an enlarged bearing surface 43 over which the ends of the control rods 26 and the reinforcement rods 24 are freely received. A spring washer 44 is also received over the shoulder, and provides for exerting sufficient pressure against the ends of these rods to avoid objectionable noise or rattle, while still leaving the rods free to pivot about the bolts 42. This construction therefore provides a floating yoke, and permits the yoke to move in its own predetermined path of movement and to move in translation with the displacements of the control rods without following the arcuate path thereof.

A bolt 50 passes through the aperture in plate 33 and is received inwardly of the spring 36. The forward end of the bolt is threaded to receive a shouldered jam nut 51, over which the end of the spring seats, the end of the spring being flattened as described above to provide a proper and uniform flat face for the transmission of the spring force and to maintain the spring and the yoke member in continuously alined and directly opposed relation to the face of the abutment plate 31. The bolt is threaded through the end of the yoke, and on its outer end receives an acorn nut 52, the position of which is adjustable to vary the tension of the spring and to adjust the device to accommodate different weights of riders.

At its inner end, the bolt is formed with a head 53, under which there is received a metal washer 54 which provides for transmitting the thrust on the bolt into a bumper 55. This bumper may be a spring similar to spring 36 but preferably is constructed as a rubber member as shown adapted to bear against the rear face of abutment plate 31. This construction provides for checking expansion of the spring with a resilient action, and thus checks rebound during the ride, or when for any reason the load should be suddenly reduced or removed from the bicycle.

In operation, and referring to the diagrammatic showing in Fig. 4, the full lines represent the parts substantially in the free or unloaded position of the bicycle. In this position the spring 36 is in the position of its maximum expansion, and has drawn the bolt head 53 up against the bumper 55 to bring the same against abutment plate 31.

The dotted line showing in Fig. 4 represents substantially the intermediate and maximum positions of compression of the spring. Throughout these several positions, the ends of the control rods 26 are shown as following an arcuate path about the center determined by the pivot axis of the bolt 16. The yoke moves in translation forwardly and rearwardly with the ends of the control rods but being swiveled upon the rods, does not swing in this arcuate path, and is not required to assume the angular position which would result if it did follow this arcuate path. In the present construction, the yoke is at all times freely mounted upon the ends of the control rods, in the nature of a floating member, and is thus free to assume its own angular relationship. Such angular relationship is determined by the force exerted on the compression spring, which develops a strong component tending to restore the parts to directly opposed relation upon any displacement therefrom. Thus the yoke member swivels about the ends of the control rods in the course of their movement to tend to maintain itself in predetermined relationship to the abutment plate. In the arrangement shown, with the abutment plate standing substantially vertical, the yoke member tends to follow and maintain itself in a substantially horizontal position throughout its movement of translation.

It will be further evident that the bolt 50 being fixedly secured in the yoke, will likewise be maintained in predetermined relationship with respect to the abutment plate. This means that only a relatively small clearance is required for providing for movement of the bolt through the aperture in the abutment plate, and assures that at all times and under all conditions of compression, the bolt will be maintained essentially normal to the plate and without producing material or objectionable frictional wear or rubbing against the sides of the aperture. The arrangement of the pivotal movement of the yoke with respect to the vertical plane passing through the axis of shaft 16 is further desirable as providing for the arrangement of the parts to be such that bolts 42 will stand approximately in this plane in the middle position of their arcuate movement. Thus with a lesser load, the bolts 42 will move forwardly slightly beyond the top center position, and in the fully loaded position will move rearwardly a similar distance. However the total movement is limited, and by reason of occurring at or about the top of the arcuate travel of the rods, the total extent of vertical movement of the yoke assembly from fully compressed to fully extended positions is very small and as a practical matter, negligible. Consequently a limited degree of clearance around the bolt will provide for proper and continuous operation and avoid excessive wear and rubbing. Likewise the absence of angularly directed forces assures a more firm and steady support and assures that the compressive action will be uniformly distributed over the spring and bumper members.

While the form of apparatus herein described constitutes a preferred embodiment of the invention, it is to be understood that the invention is not limited to this precise form of apparatus, and that changes may be made therein without departing from the scope of the invention which is defined in the appended claim.

What is claimed is:

In a resiliently mounted bicycle having a frame, a steering post assembly, fork sides pivotally attached to the lower end of said assembly for receiving the wheel therebetween, control rods extending upwardly from the lower ends of said fork sides, means for causing the upper ends of said control rods to move in an arcuate path about the pivot axis of said fork sides, an abutment plate extending forwardly and upwardly from said assembly in fixed relation thereto, a yoke member, means for pivotally attaching said control rods to said yoke member providing for free pivotal movement of said rods in translation with respect to said yoke, resilient means interposed between said abutment plate and said yoke member for yieldably supporting the load on said bicycle, said resilient means having flattened guide portions at the ends thereof for engagement with said abutment and with said yoke respectively to guide said yoke for movement in a path substantially tangent to said arcuate path of travel maintaining said yoke in opposing face to face relation with said abutment plate throughout its extent of travel, a rod fastened to said yoke and projecting rearwardly through an axially aligned aperture in said abutment plate and movable with said yoke in an axial direction through said aperture, and resilient means carried by said rod on the opposite side of said abutment plate for checking rebound.

JOHN H. HORSTMAN.